United States Patent [19]

Haseotes et al.

[11] Patent Number: 5,802,745

[45] Date of Patent: Sep. 8, 1998

[54] HYDRAULIC SYSTEM FOR A ROAD VEHICLE

[76] Inventors: Byron Haseotes, 18 Lover's La., Southboro, Mass. 01745; Harry Zervas, 59 Sherwood Ave., North Providence, R.I. 02911

[21] Appl. No.: 528,942

[22] Filed: Sep. 15, 1995

[51] Int. Cl.⁶ ..................................... E01H 5/04
[52] U.S. Cl. .............................. 37/234; 37/236; 37/238; 180/53.7
[58] Field of Search .............................. 37/234, 236, 238, 37/244, 248–249, 902; 60/456; 180/53.1, 53.4, 53.7

[56] References Cited

U.S. PATENT DOCUMENTS

| | | | |
|---|---|---|---|
| 2,283,101 | 5/1942 | Snook | 37/43 |
| 2,799,510 | 7/1957 | Schmidt | 37/234 X |
| 2,955,368 | 10/1960 | Winsett | 37/42 |
| 3,035,414 | 5/1962 | Smith | 60/456 X |
| 3,055,127 | 9/1962 | Williamson | 37/43 |
| 3,065,601 | 11/1962 | Comfort | 60/456 X |
| 3,165,842 | 1/1965 | Holopainen | 37/234 |
| 3,590,580 | 7/1971 | Vaughan | 60/456 X |
| 3,706,144 | 12/1972 | Miceli | 37/234 |
| 3,751,191 | 8/1973 | Mott, Jr. et al. | 60/456 X |
| 3,759,340 | 9/1973 | Schilter | 180/53 FE |
| 3,962,870 | 6/1976 | Lech | 60/456 X |
| 4,022,021 | 5/1977 | Russell, Jr. | 60/456 X |
| 4,187,624 | 2/1980 | Blau | 37/42 R |
| 4,258,765 | 3/1981 | Suomi | 172/449 X |
| 4,279,084 | 7/1981 | Low et al. | 37/42 |
| 4,391,052 | 7/1983 | Guy, Jr. | 37/236 |
| 4,421,449 | 12/1983 | Cotton | 414/685 |
| 4,439,939 | 4/1984 | Blau | 37/231 |
| 4,461,341 | 7/1984 | Morrison | 60/456 X |
| 4,475,332 | 10/1984 | Anderson et al. | 60/456 X |
| 4,632,200 | 12/1986 | Doyen et al. | 180/53.7 |
| 4,705,450 | 11/1987 | Gano | 180/53.4 X |
| 4,763,744 | 8/1988 | McVicar | 180/53.7 |
| 4,825,970 | 5/1989 | McVicar et al. | 180/53.7 |
| 4,898,078 | 2/1990 | Gage et al. | 91/524 |
| 4,898,333 | 2/1990 | Kime et al. | 180/53.4 X |
| 4,903,368 | 2/1990 | Duthie et al. | 60/456 X |
| 5,056,601 | 10/1991 | Grimmer | 60/456 X |
| 5,094,309 | 3/1992 | Vlaanderen et al. | 180/53.7 |
| 5,222,875 | 6/1993 | Clark | 60/456 X |
| 5,265,356 | 11/1993 | Winter | 37/234 |
| 5,315,829 | 5/1994 | Fisher | 60/456 |
| 5,317,872 | 6/1994 | Ingvast | 60/456 X |
| 5,346,018 | 9/1994 | Koster | 172/47 |
| 5,467,828 | 11/1995 | Ruozi | 60/456 X |

FOREIGN PATENT DOCUMENTS 743382  9/1966  Canada ................................ 60/456

OTHER PUBLICATIONS

Promotional Literature, Pronovost Inc. (No Date).
Promotional Literature, The Erskine Manufacturing Co. Inc. (No Date).

Primary Examiner—Tamara L. Graysay
Assistant Examiner—Thomas A. Beach
Attorney, Agent, or Firm—Medlen & Carroll, LLP

[57] ABSTRACT

A hydraulic system used in conjunction with a standard pickup truck and the like for powering a snowblower and other implements. The hydraulic system provides power for controlling up and down movement of a snowblower and for driving the snowblower's auger and fan. The hydraulic system, which only minimally impacts the pickup truck's horsepower output, is designed so that all of its mechanical components may be placed within the truck's engine compartment. The hydraulic system can be easily connected to and removed from a truck's existing engine mount, and the snowblower unit itself is designed so that it may be easily attached to the vehicle.

14 Claims, 7 Drawing Sheets

HYDRAULIC SYSTEM FOR A ROAD VEHICLE

FIELD OF THE INVENTION

The present invention relates to hydraulic systems used in conjunction with standard pickup trucks and the like for powering various implements and particularly to hydraulic systems used to power snow removal devices.

BACKGROUND OF THE INVENTION

Snow removal for commercial real estate (e.g., the parking lots of shopping centers), driveways, and other relatively large areas is typically performed by plows. The first snow plows entailed the use of expensive heavy machinery, such as tractors, to operate the plows. In order to avoid having to purchase an expensive piece of machinery specifically for the purpose of plowing, snow plows have subsequently been designed that can be used with standard vehicles (e.g., automobiles and pickup trucks).

Different snow plows are available that can be attached to standard vehicles. In general, the plow is mounted on a frame, which in turn is coupled to the undercarriage of the vehicle. For example, U.S. Pat. No. 2,283,101 to Snook describes one of the earlier snow plowing devices designed for use with a standard vehicle; all of the moving parts of that rotary snow plow are driven by the vehicle's power transmission shaft. The snow plow is mounted on front wheels and does not include a hydraulic means for allowing the plow to be raised and lowered. U.S. Pat. Nos. 4,187,624 and 4,439,939 to Blau exemplify the advances made in the design of snow plows adapted for use with small vehicles. To illustrate, the blade of the Blau device can be elevated and moved from side-to-side by means of a hydraulic system mounted in the vehicle's engine compartment. These snow plows are effective at moving snow away from the vehicle's traction areas.

Despite improvements over the years, a major drawback of plows is that they merely push the snow into piles. The piles of snow, which later freeze, become obstacles to both humans and machinery. Similarly, the plowing of snow can result in the damage or destruction of shrubbery and other items that are in the path of the plowed snow. In addition, the snow plow systems mounted on standard vehicles place undue strain when the vehicles' transmission and bearing systems. Such strain results in a decrease in the working life of the vehicles. Finally, snow plows are generally not suitable for working in narrow areas. For instance, snow plows mounted on standard vehicles could not be used to push large snow piles a distance of 200 feet because of the strain placed on the vehicles.

What is needed is a snow removal device adapted to be used with a standard vehicle like a pickup truck wherein the device effectively moves snow away from the vehicle. The device should be capable of being connected to the vehicle without extensive modification thereto, and movement of the device should be controlled by a hydraulic system that does not place undue strain on the vehicle. Finally, the device should be economical, both in terms of its initial cost and subsequent maintenance costs, so that small business owners, homeowners, and the like can afford and benefit from it.

SUMMARY OF THE INVENTION

The present invention relates to hydraulic systems used in conjunction with standard pickup trucks and the like for powering various implements and particularly to hydraulic systems used to power snow removal devices.

One objective of the present invention is to provide a hydraulic system that operates off of a standard vehicle's engine to provide all of the hydraulic power needed to operate an implement (e.g., a snowblower) mounted on the front of the vehicle. All of the components of the hydraulic system may be mounted in the vehicle's engine compartment or on the snowblower unit itself. In addition, depending on the configuration of the pickup truck, the hydraulic system may be mounted on the pickup truck's undercarriage.

Another objective of the present invention is the provision of a hydraulic system that can be easily connected and disconnected from the vehicle.

The present invention contemplates a hydraulic system adapted to take power from the engine of a road vehicle for driving an implement, comprising: (a) hydraulic fluid, the hydraulic fluid contained within fluid transport means and capable of being heated by the operation of the hydraulic system; (b) a pump, the pump adapted to receive power generated by the engine and to use that power to pressurize the hydraulic fluid; (c) a motor, the motor adapted to receive the pressurized hydraulic fluid from the pump via the fluid transport means, to drive the implement; and (d) a heat exchanger, the heat exchanger coupled to the fluid transport means and adapted to remove the heat from the pressurized hydraulic fluid after the hydraulic fluid has been discharged from the motor. In particular embodiments, the heat exchanger is adapted to be contained within the engine compartment of the road vehicle.

Moreover, certain embodiments of the hydraulic system also comprise (e) a tank, the tank in fluidic communication with the fluid transport means and providing a reservoir for the hydraulic fluid after removal of heat from the hydraulic fluid by the heat exchanger. When the hydraulic system comprises a tank, the tank is adapted to be contained within the engine compartment of the road vehicle in some embodiments. In particular embodiments, the tank has a capacity of less than 5 gallons. In other embodiments, the tank has a capacity of less than 2.5 gallons.

In some embodiments of the hydraulic system, the pump is a variable displacement pump. Conversely, in other embodiments, the pump is a fixed displacement pump.

In particular embodiments of the present invention, the heat exchanger has a capacity of greater than 15,000 BTU/h. In further embodiments, the heat exchanger has a capacity of greater than 25,000 BTU/h. Additionally, in some embodiments of the present invention the heat exchanger has a check valve to allow the hydraulic system to be started in cold conditions.

The present invention also contemplates a method of transferring power to an implement from an engine of a road vehicle, comprising the following steps: (a) providing: i) a road vehicle having an implement and an engine compartment, the engine compartment containing an engine for generating power entirely within the engine compartment, and ii) a hydraulic system capable of being contained entirely within the engine compartment, the hydraulic system comprising: a) hydraulic fluid, the hydraulic fluid contained within fluid transport means and capable of being heated by the operation of the hydraulic system, b) a pump, the pump adapted to receive power generated by the engine and to use that power to pressurize the hydraulic fluid, c) a motor, the motor adapted to receive the pressurized hydraulic fluid from the pump via fluid transport means to drive the implement, and d) a heat exchanger, the heat exchanger coupled to the fluid transport means and adapted to remove heat from the pressurized hydraulic fluid after the hydraulic fluid has been discharged from the motor; (b) transferring the power generated by the engine to the pump of the hydraulic system, thereby allowing the pump to pressurize the hydraulic fluid; and (c) conducting the pressurized hydraulic fluid to the motor to drive the implement, the motor discharging the heated hydraulic fluid.

In some embodiments of the hydraulic system, the pump is a variable displacement pump. Conversely, in other embodiments, the pump is a fixed displacement pump.

In particular embodiments of the present invention, the heat exchanger has a capacity of greater than 15,000 BTU/h. In further embodiments, the heat exchanger has a capacity of greater than 25,000 BTU/h. Additionally, in some embodiments of the present invention the heat exchanger has a check valve to allow the hydraulic system to be started in cold conditions.

Some embodiments of the method of transferring power to an implement from an engine of a road vehicle further comprise, after step (c) above, conducting the heated hydraulic fluid into the heat exchanger, the heat exchanger removing the heat from the heated hydraulic fluid, resulting in cooled hydraulic fluid.

Moreover, certain embodiments further comprise the step of conducting the cooled hydraulic fluid to a tank, the tank in fluidic communication with the fluid transport means and providing a reservoir for the cooled hydraulic fluid. In particular embodiments, the tank has a capacity of less than 5 gallons. In other embodiments, the tank has a capacity of less than 2.5 gallons.

DEFINITIONS

To facilitate understanding of the invention described in the disclosure that follows, a number of terms are defined below:

The term "power takeoff" refers to any type of arrangement that is capable of drawing power from the engine of a vehicle and using that power to perform an auxiliary function, such as driving an implement. Common power takeoff designs involve a pulley mounted on the forward end of a vehicle's engine for communicating drive by means of at least one belt to a component like a pump; in turn, the pump performs some function distinct from the normal functions of a vehicle, such as driving a snowblower.

The term "implement" refers to any apparatus, instrument, or tool connected to a vehicle and adapted to be driven by the power takeoff/hydraulic system of the present invention. A snowblower is one example of an implement contemplated by the present invention; the snowblower's auger and fan are driven by the power taken from the vehicle's engine.

The term "road vehicle" refers to any type of motorized apparatus that can be driven on a paved or unpaved surface and that has its engine enclosed within a defined space at its forward end (i.e., the engine compartment). In the preferred embodiment, the road vehicle is a standard commercially available pickup truck.

The term "pump" refers to the general class of devices that compresses fluids by subjecting them to pressure. The present invention contemplates the pump receiving power communicated from the road vehicle's engine and using that power to pressurize the hydraulic fluid contained within the hydraulic system of the present invention. Both fixed displacement pumps (i.e., pumps that are not able to regulate output in response to fluctuations in the vehicle RPM) and variable displacement pumps (i.e., pumps that are able to regulate and compensate for discharge conditions above a set RPM level) are encompassed by the term "pump."

The term "motor" refers to an apparatus, such as an engine, that causes or imparts motion. For example, the motor of the preferred embodiment converts the energy within pressurized hydraulic fluid into rotary motion that can then be used to drive a snowblower's auger and fan.

The term "heat exchanger" refers to a device that removes heat from a fluid substance, such as hydraulic fluid. In general, a heat exchanger contains tubing through which the fluid flows and surrounding fins that blow air over the tubing to dissipate the heat within the fluid.

The term "cold conditions" refers to conditions where the ambient temperature is below approximately 40° F. and typically is typically between approximately +35° F. and −20° F.

The term "check valve" refers to the general class of devices able to regulate the flow of fluid. In some embodiments, the check valve restricts fluid from flowing in a particular direction (i.e., a one-way valve). In other embodiments, the check valve is used in conjunction with a heat exchanger to allow a hydraulic system to be started in cold conditions. For example, a check valve may allow the hydraulic fluid to circumvent the heat exchanging components of the heat exchanger when the pressure of the fluid exceeds a particular level.

The term "tank" refers to any type of reservoir or receptacle for storing a fluid such as hydraulic fluid.

The term "transferring" refers to the act of conveying, communicating, or transporting a non-fluid substance from one location to another. To illustrate, the power takeoff mechanism of the present invention takes power generated by the vehicle's engine and transfers that power to an auxiliary pump located within the vehicle's engine compartment.

The term "conducting" refers to the act of conveying a fluid substance from one location to another through channels and the like. For example, the hydraulic fluid of the present invention is conducted from the pump to the motor, and from the motor to the heat exchanger, through fluid transport means (e.g., tubing).

DESCRIPTION OF THE INVENTION

The present invention relates to hydraulic systems used in conjunction with standard pickup trucks and the like for powering various implements and particularly to hydraulic systems used to power snow removal devices (e.g., front-mounted snowblowers). The hydraulic system is designed to be contained entirely within the engine compartment of the vehicle. However, the hydraulic system may also be mounted outside the engine compartment. For example, the hydraulic system may be fastened to the snowblower mounting frame or, depending on the configuration of the pickup truck,.it may be mounted on the support members under the pickup truck's body. Though the description that follows is directed at the use of a hydraulic system to power a front-mounted snowblower, it is to be understood that the hydraulic system may also be used with snow plows, street sweeping apparatuses, and other types of implements.

A. Snowblowers In General

The introduction of snowblowers provided a mechanism to move snow away from the snow removal device itself. Thus, snowblowers are more advantageous than snow plows in many circumstances. Snowblowers operate by essentially sucking snow into the device and then expelling the snow into the air so that it lands a distance away from the snowblower; in this manner, the snow is spread over a large area and does not damage the surroundings when it lands on the ground. Originally, snowblowers were used behind a tractor (e.g., coupled to the tractor's drive shaft), which required the operator of the tractor to drive forward while simultaneously looking backward to monitor the snowblower's function. Front-mounted snowblowers later became available, providing a method of avoiding the dangerous practice of having to look in one direction while driving in another.

Many front-mounted snowblowers require an auxiliary engine to drive the snowblowing mechanism. For example, U.S. Pat. No. 4,632,200 to Doyen et aL describes a drive system that includes an engine placed in the bed of a carrier vehicle, such as a large truck; the drive system entails a universal drive shaft positioned under the vehicle's floor which can be used to power a front-mounted snowblower. Similarly, Pronovost, Inc. (Quebec, Canada) manufactures front-mounted snowblowers that can be used with small and medium size trucks. Unfortunately, the snowblowers are driven by an engine placed in the truck's bed, an additional expense that must be borne by the snowblower's operator.

Other front-mounted snowblowers do not require an auxiliary engine to drive the snowblower. The Erskine Manufacturing Co., Inc. (Erskine, Minn.) is involved in the manufacture of front-mounted snowblowers that utilize either 1) the rear drive shaft on tractors, or 2) the existing hydraulic mechanism on "bobcats". These Erskine snowblower devices cannot be used in conjunction with standard pickup trucks.

Devices have been developed that provide a power takeoff attachment for a conventional vehicle (e.g., a standard pickup truck) that can be used to drive a snowblower. For example, U.S. Pat. No. 4,825,970 to McVicar et al. discloses a power takeoff attachment for a road vehicle, the attachment being capable of driving a snowblower. The McVicar et al. patent involves a pulley mounted on the engine for communicating drive to the snowblower. However, the McVicar et al. device lacks any hydraulic components and thus is unable to raise, lower, or propel the snowblower.

U.S. Pat. No. 5,346,018 to Koster specifically addresses the disadvantage of the McVicar et al. device. The Koster device involves a) a three-point hitch assembly that can support a variety of implements and is attached to the front end of a pickup truck or the like, and b) a power takeoff driven by a pulley attached below the engine pulley of the truck; the power takeoff is controlled by an electric clutch. The hitch has a hydraulic lift that allows a snowblower to be raised or lowered; hydraulic lift power is taken from the vehicle's power steering system through the use of electrically controlled solenoid valves. Therefore, the hydraulic power means requires modification of the vehicle's power steering system, a process that can be both expensive and complex.

The present invention provides a hydraulic system that is capable of being driven by the engine of a vehicle such as a standard pickup truck or the like to power a front-mounted snowblower or other implement. The hydraulic system is designed so that it can be contained entirely within the engine compartment of the vehicle and so that it requires minimal modification of the vehicle's mechanical components. Finally, the hydraulic system is capable of raising and lowering the snowblower, as well as driving its auger and fan, without subjecting the vehicle to undue strain. Any typical snowblower can be used with the hydraulic system of the present invention. For instance, the Erskine Manufacturing Co., Inc. (Erskine, Minnesota) manufactures rotary snowblowers suitable for use with the present invention; indeed Erskine Manufacturing Co., Inc.'s Model No. X was used with the hydraulic system.

B. Modifications To Conventional Hydraulic Systems

Conventional hydraulic systems have been used for a number of years to accomplish many diverse functions. Because many of these functions have unique requirements, improvements have been made to conventional hydraulic systems to enhance the operation of such systems for particular functions. For example, U.S. Pat. No. 5,265,356 to Winter, hereby incorporated by reference, describes a hydraulic system for a hydraulic-piston-lifted snowplow; more specifically, the Winter patent describes an improvement to a conventional hydraulic system that allows less than the full weight of the plow blade to rest on the surface being plowed. Similarly, U.S. Pat. No. 4,898,078 to Gage et al., hereby incorporated by reference, describes a hybrid hydraulic system for a work vehicle that utilizes a fixed displacement pump for pressurizing an open center hydraulic system and a variable displacement pump for pressurizing a close center hydraulic system; this hybrid system combines the attributes of each of the individual systems. Thus, numerous patentable improvements have been made to conventional hydraulic systems.

The use of a conventional hydraulic system to power a front-mounted snowblower of the size and power contemplated by the present invention would require a reservoir or tank of approximately 60 gallon capacity to allow for proper heat removal and volume expansion/contraction of the hydraulic fluid. Because of space and weight limitations, it is not feasible to place such a large tank under the hood of a standard vehicle. Therefore, in order to provide a power takeoff hydraulic system that fits within the engine compartment of a standard pickup truck, the hydraulic system requires a design different from that of conventional systems. The hydraulic system of the present invention can be used in conjunction with any truck model that generates at least 150 HP.

However, it should be noted that the present invention does not require that the tank be mounted within the engine compartment. Indeed, the preferred location for mounting the tank is on the frame in the area between the back of the snowblower and the front end of the pickup truck (see below). By mounting the tank outside the engine compartment, there is more heat dissipation from the tank because of air flow over the tank's exterior. In addition, less room is required within the truck's engine compartment when the tank is mounted externally. Indeed, in an embodiment of the present invention in which the only components mounted within the engine compartment are the clutch pump and the bracket that attaches it to the engine mount, only approximately ½ cubic feet of space are required within the engine compartment.

The hydraulic system of the present invention uses a heat exchanger in conjunction with a tank. The heat exchanger withdraws much of the heat generated by operation of the hydraulic system. As a result, the present invention contemplates the use of a tank having a capacity of much less than 60 gallons; in fact, the preferred embodiment requires a tank of less than five gallon capacity, and generally less than three gallon capacity. Not only does this heat exchanger/tank arrangement provide for proper heat removal and volume expansion/contraction of the hydraulic fluid, the arrangement requires only a fraction of the space of a conventional system because of the use of the smaller tank. Therefore, this heat exchanger/tank arrangement allows the entire hydraulic system to be mounted within the engine compartment of a standard vehicle.

The invention contemplates the use of a conventional heat exchanger unit having tubes or fins for the actual heat exchanging process. For example, heat exchangers manufactured by Hayden Heat Exchangers (Corona, Calif.) are suitable for use with the present invention. Air must flow over these tubes or fins to help dissipate the heat that accumulates in the heat exchanger. At least three options are available to generate this air flow. First, the heat exchanger may be placed in front of the vehicle's radiator, thereby using the vehicle's fan to generate air flow over the heat exchanger. Because the radiator on a standard pickup truck is approximately three times the size of the heat exchanger itself, the vehicle's fan is sufficient for dissipating the heat. Second, the same general arrangement can be used as in the first option, except with a smaller heat exchanger and an auxiliary fan. Due to the smaller surface area of the heat exchanger unit, the auxiliary fan is required to provide adequate air flow over the unit; a small electric fan mounted adjacent to the heat exchanger is suitable for this purpose.

In the third option, the heat exchanger and tank may be made a part of the blower payload unit. For example, the heat exchanger and tank may be mounted on the back plate of the shovel of a typical snowblower; of course, those components may be mounted in other suitable places outside the engine compartment. When the heat exchanger is mounted in this manner, cooling would be provided passively by the process of conduction; in addition, an electric fan may be used to provide active cooling as well. Thus, this option would require the least amount of space within the truck's engine compartment. Each of the three options described provide effective cooling and ease of assembly without requiring the mounting of a large tank in the engine compartment.

As indicated above, the heat exchanger/tank arrangement is designed to be used in standard pickup trucks. However, it should be noted that the hydraulic system may also be used with other vehicles, such as large automobiles, if the vehicles have a suitable suspension and enough space in their engine compartments to accommodate the system.

C. Overview Of The Hydraulic System

Figure 1:
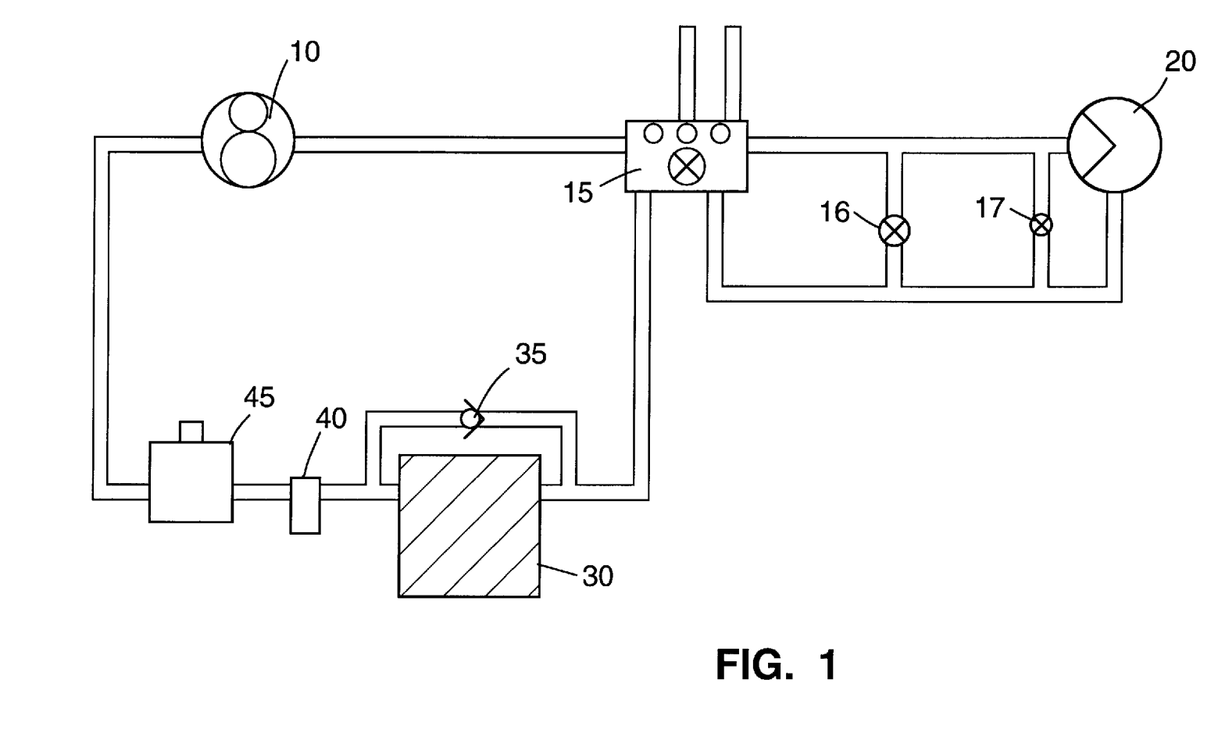
FIG. 1 is a schematic diagram of the hydraulic system.

FIG. 1 provides a schematic overview of the hydraulic system. As is apparent from FIG. 1 and the description that follows, the hydraulic system is a closed system that entails a primary circuit for the flow of hydraulic fluid and several bypasses and diversions from the primary circuit. The primary circuit essentially comprises the main components of the hydraulic system (e.g., the hydraulic motor and the heat exchanger) and a fluid transport means (e.g., tubing, hoses, channels, etc.) through which the hydraulic fluid flows from one component to another. The bypasses and diversions either accommodate hydraulic fluid that exceeds a particular pressure, etc, or allow for the operation of auxiliary functions, such as the hydraulic lift.

Figure 2A:
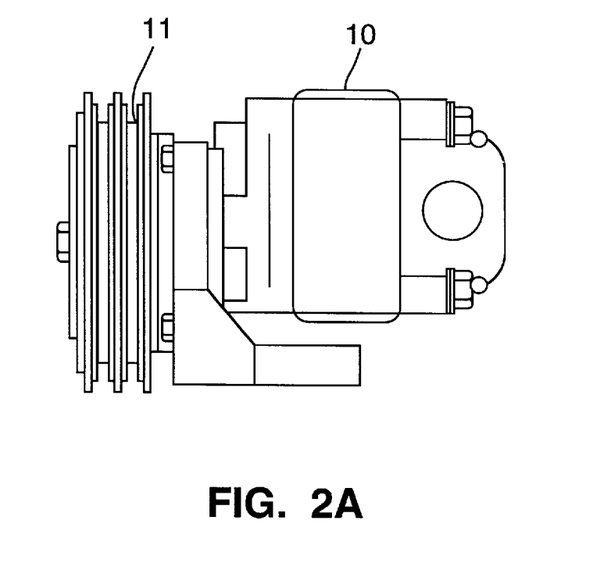
FIG. 2A is a side view of a typical clutch pump contemplated for use with the present invention depicting the clutch pump dual pulley arrangement.

Referring to FIG. 1, the primary circuit begins with a quick series clutch pump 10 mounted onto the engine mount frame assembly and powered by a dual-belted pulley arrangement (FIG. 2A). The present invention is not limited to any particular clutch pump. Rather, any clutch pump can be used if it fulfills the necessary torque and pressure requirements (see below). The quicksilver series of clutch pumps manufactured by Ralph C. Herman Co. (Marlboro, New York) provides high torque and high pressure performance. Hydraulic fluid exits the clutch pump 10 (high pressure, high flow) through its discharge port 12 (FIG. 2B) and enters a control valve 15 through an inlet port. The control valve 15 is capable of diverting part of the hydraulic fluid from the primary circuit to allow for operation of auxiliary hydraulic finctions. In essence, the control valve 15 is a diverter valve which receives high pressure hydraulic fluid and diverts it to a spool valve (not shown); in turn, when activated either electrically or by a mechanical lever, the spool valve releases hydraulic fluid through an outlet port at a pressure sufficient to raise or rotate (i.e., turn left or right) the blower.

The remainder of the hydraulic fluid (or all of the hydraulic fluid if none is diverted outside the primary circuit) is sent from an outlet port of the control valve 15 to an inlet port of the hydraulic motor 20 to be used to drive the fan and the auger. A relief valve 16 is employed near the discharge end of the control valve 15 to provide a ceiling on the pressure of the hydraulic fluid that enters the hydraulic motor 20. In a preferred embodiment, when the pressure of the hydraulic fluid exiting the control valve 15 exceeds, for example, 3000 psi, the relief valve 16 opens and diverts enough fluid to allow the fluid's pressure to be maintained at or below 3000 psi; the hydraulic fluid diverted through the relief valve 15 bypasses the hydraulic motor 20 and subsequently re-enters the primary circuit at a point after the hydraulic motor 20. The relief valve 16 remains closed unless the hydraulic fluid exceeds a predetermined pressure (e.g., 3000 psi).

A ball-type check valve 17 is positioned near the entrance to the hydraulic motor 20 after the relief valve 16. The ball check valve 17 serves to restrict hydraulic fluid from entering the hydraulic motor 20 through its low pressure discharge end; thus, fluid is only able to enter the high pressure inlet end of the motor 20. The ball check valve 17 allows for manual reverse circulation of the hydraulic fluid when the hydraulic system is shut down without pressuring the system.

The flow of hydraulic fluid into the hydraulic motor 20 produces rotary motion of the motor 20, and this rotary motion is then transferred to the snowblower's gear box to power the snowblower's auger and blower fan. Thereafter, the hydraulic fluid (low pressure, high flow) exits the hydraulic motor 20 through an outlet port, passes through the control valve 15, and enters the heat exchanger 30 through an inlet port. A bypass check valve 35 (see FIG. 1) built into the heat exchanger 30 allows the hydraulic fluid to circumvent the heat exchanging components when the pressure of the fluid exceeds a particular value (e.g., 10 psi). Alternatively, the bypass check valve 35 may be in parallel with the heat exchanger (i.e., separate from the heat exchanger itself). Such a situation occurs, for example, when the hydraulic fluid is cold (e.g., less than 40° F.) and thus highly viscous, resulting in greater pressure through the lines.

The hydraulic fluid that exits the outlet port of the heat exchanger 30 then passes through a filter 40; the filter 40 is generally a 10–30 micron filter. Thereafter, the filtered fluid enters the inlet port of a tank 45 of less than 5 gallon capacity; thus, as indicated above, the tank utilized in the present invention is much smaller than the approximately 60 gallon tank required by a conventional system. The tank is thereby in fluidic communication with the fluid transport means and provides a reservoir of hydraulic fluid to accommodate, at a minimum, the volume shift that occurs during variance of the temperature of the hydraulic fluid. The primary circuit of the system is completed when hydraulic fluid (low pressure) exits the outlet port of the tank and enters the inlet port 13 (FIG. 2B) of the clutch pump 10.

D. The Clutch Pump Mounted To The Vehicle's Engine

As noted above, the clutch pump 10 is mounted to the vehicle's engine mount frame assembly and takes power off of the engine. The hydraulic system must be designed so that when the vehicle is operating under normal conditions, the clutch pump 10 discharges hydraulic fluid at a pressure adequate for snow blowing.

As illustrated in FIG. 2A, a side view of a clutch pump 10 contemplated for use with the present invention, the clutch pump 10 has a clutch pump dual pulley 11; the clutch pump dual pulley 11 connects via belts (not shown) to an engine dual pulley 101 (FIG. 3) mounted on the engine shaft. As indicated above, clutch pumps manufactured by the Ralph C. Herman Co. of Marlboro, N.Y., may be used with the present invention; of course, suitable clutch pumps from other manufacturers may also be used (e.g., Northern Hydraulics, City/State).

Figure 2B:
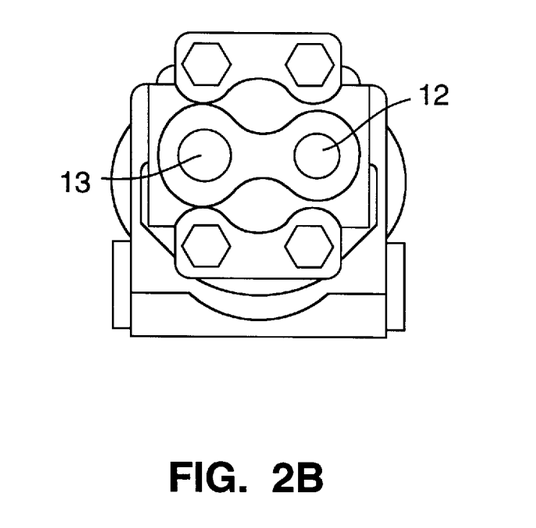
FIG. 2B is a rear view of a clutch pump contemplated for use with the present invention depicting the inlet and discharge ports of the clutch pump.

The inlet port 13 and the discharge port 12 of the clutch pump 10 are depicted in FIG. 2B. When the clutch pump dual pulley 11 is configured to rotate in the clockwise direction (i.e., the standard direction for rotation), there is suction at the inlet port 13 and high pressure output at the discharge port 12.

Tests were performed to determine the optimum design for the power takeoff arrangement. With a gear ratio of 1:0.92, (truck pulley diameter: clutch pulley diameter) pickup truck engine RPM at slightly more power than idle resulted in hydraulic fluid being discharged from the clutch pump 10 at a lower than expected pressure. A tachometer was required to monitor the variations in RPM at the different truck transmission levels (ie., drive, low-high, and low-low). The hydraulic system provided adequate blowing (ie., a throw distance of 25 feet) when the truck was operated with the transmission set at low-low. However, truck ground speed was slightly higher (approximately 5 MPH) than desired under worst-case conditions (i.e., heavy slush and/or wet ice piled up to about three feet in height).

Figure 3:
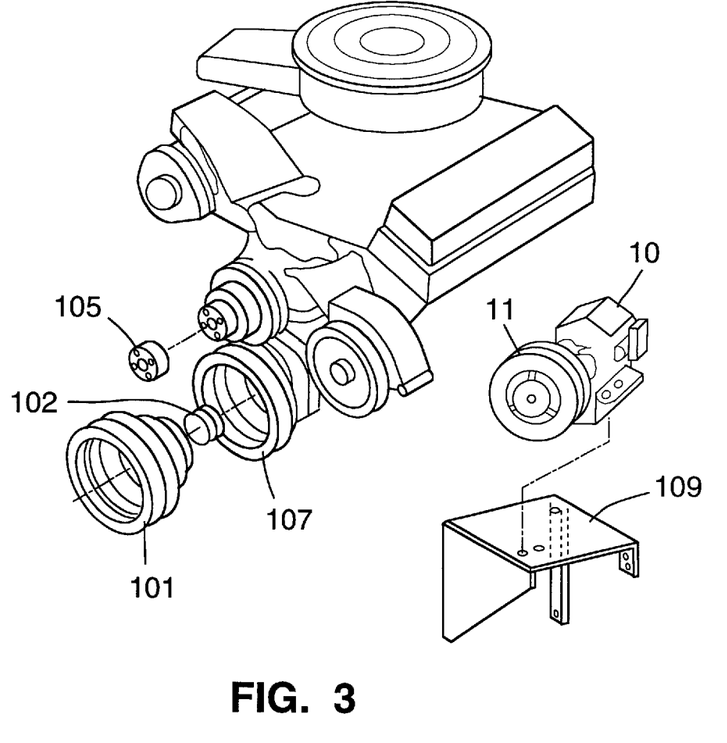
FIG. 3 is a perspective view of how some of the hydraulic system's components are mounted within the engine compartment of a vehicle.

The gear ratio was changed in order to provide adequate blowing under worst-case conditions while operating the truck at a ground speed of less than 5 MPH. This change was accomplished by increasing the diameter of the engine dual pulley 101 from 6.5 inches to 7 inches while simultaneously decreasing the diameter of the clutch pump dual pulley 11 from 7 inches to 6 inches; this change resulted in the RPM of the clutch pump dual pulley 11 increasing by about 24% for every one revolution of the engine dual pulley 101. Therefore, even under worst-case conditions, the hydraulic system does not take off so much power from the engine that the engine's performance is adversely affected.

The hydraulic system was designed using a fixed displacement pump (i.e., a pump that is not able to regulate output in response to fluctuations in the RPM of the vehicle), and all tests were conducting with such a pump. However, a variable displacement pump would be desirable to regulate and compensate for proper outlet (i.e., discharge) conditions above a set RPM level (e.g., idle); thus, a variable displacement pump would be advantageous when the vehicle requires an increase in RPM to accomplish functions other than snowblowing without the need for altering the snowblower's function.

DETAILED DESCRIPTION OF THE PREFERRED EMBODIMENT

The present invention contemplates a power takeoff hydraulic system for a vehicle like a standard pickup truck, the hydraulic system capable of providing hydraulic power to a snowblower unit mounted on the vehicle's front end. Table 1 sets forth the requirements for certain parameters relating to the hydraulic system.

TABLE 1

| Parameter | Requirement |
| --- | --- |
| maximum desired hydraulic pressure | 2500 psi |
| hydraulic lines | 5000 psi (maximum) |
| relief valve | 3000 psi (maximum) |
| filter | 10–30 microns (preferably 25); able to accommodate tubing of ¾ " inside diameter |
| gallons per minute range | 11–20 GPM |
| hydraulic fluid | 50 SUS or equivalent |
| pump | fixed or variable |

The sections that follow provide information and calculations applicable to choosing appropriate components for the preferred embodiment of the hydraulic system. The following abbreviations are used in these sections: psi (pounds per square inch); BTU (British thermal unit), RPM (revolutions per minute); GPM (gallons per minute); HP (horsepower); D (displacement); in$^3$ (cubic inches); rev. (revolution); h (hour); $P_d$ (drop in pressure per foot of tubing); V (viscosity SUS of the hydraulic fluid); F (flow in GPM), d (inside diameter of the tubing); ft-lbs (foot-pounds); FPM (feet per minute); Eqn. (Equation); NPT (national pipe thread); UNC (unified national coarse).

A. Clutch Pump Requirements

The horsepower requirements for the clutch pump at particularly flows in GPM can be calculated according to the following equation:

$$HP = (GPM \times psi)/1714 \qquad \text{Equation 1}$$

However, the required horsepower is actually greater than the value calculated from Equation 1 because of slight inefficiencies in clutch pumps and motors. Equation 2 accounts for the clutch pump's inefficiency:

$$HP'=(GPM \times psi)/(1714 \times efficiency) \qquad \text{Equation 2}$$

The horsepower wasted (ie., the heat generated at the clutch pump) for a given flow in GPM can then be determined by subtracting the value calculated in Equation 1 from the value calculated in Equation 2. Table 2 presents the horsepower requirements for various flows in GPM using the maximum hydraulic pressure of 2500 psi (Table 1) and a pump efficiency estimated at 90%.

Table 2 also indicates the clutch torque rating at particular flows and RPM. Based on the calculated values, the clutch torque rating should be approximately 75 ft-lbs. In Table 2, the horsepower wasted was determined by subtracting the horsepower value generated from Equation 1 from that generated from Equation 2. Torque was calculated by multiplying the horsepower value calculated from Equation 1 by 5252, then dividing the product by RPM (ie., (HP×5252)/RPM).

TABLE 2

| GPM | HP (Eqn. 1) | HP' (Eqn. 2) | Horsepower Wasted | Torque (ft-lbs) |
|---|---|---|---|---|
| 11 | 16.0 | 17.8 | 1.8 | 70 (at 1200 RPM) |
| 18 | 26.3 | 29.2 | 2.9 | 77 (at 1800 RPM) |
| 20 | 29.2 | 32.4 | 3.2 | 85 (at 1800 RPM) |

Though the present invention is not limited to a particular model of clutch pump or clutch pumps produced by a particular manufacturer, the Silver Series belt-driven 6 inch hydraulic clutch pump (model No. SCP-18-R-R-N-N-7 V) manufactured by Ralph C. Herman Co. (New York) may be used in the preferred embodiment. The pump has a standard dual groove 0.5 inch×380 V-Belt and is right hand (i.e., CW or clockwise). The pump, which is able to produce the maximum required speed of approximately 3000 RPM, has an electrical connection to the pickup truck's battery (12 Volt DC). Moreover, the pump has an efficiency of greater than 90% to minimize pressure loss that results in heat generation. Heavy duty side load bearings are required for long service life of the pump.

B. Hydraulic Motor Displacement Requirements

The displacement (D) requirements for the hydraulic motor at particularly flows in GPM can be calculated as follows:

$$GPM=(D \times RPM)/231 \quad D=(GPM \times 231)/RPM \qquad \text{Equation 3}$$

Table 3 presents the displacement requirements for various flows in GPM at the indicated RPM.

TABLE 3

| GPM | RPM | Displacement (in³/rev.) |
|---|---|---|
| 11 | 1500 | 1.7 |
| 18 | 1500 | 2.8 |
| 18 | 1800 | 2.3 |

C. Pressure Drop Through The Tubing

The pressure within the tubing through which the hydraulic fluid flows will decrease as the fluid progresses through the tubing. This loss of pressure does no work and is an important factor in determining the capacity of the heat exchanger required by the hydraulic system (see below). The following equation can be used to determine the pressure drop in the tubing of the hydraulic system:

$$P_d=(V \times F)/(18,300 \times d^4) \qquad \text{Equation 4}$$

where $P_d$=drop in pressure per foot of tubing, V=viscosity SUS of the hydraulic fluid, F=flow in GPM, and d=inside diameter of the tubing. Table 4 contains values for $P_d$ calculated at various flows (F) in GPM using a value of V equal to 50 SUS (Table 1) and using a value of 0.5 inch for d. Assuming that a total of 50 feet of tubing (of identical inside diameter throughout) are used in the hydraulic system, the total pressure drop across the entire system can also be determined.

TABLE 4

| GPM | $P_d$ (psi/foot) | Pressure Loss Over 50 Feet* |
|---|---|---|
| 11 | 0.48 | 24 |
| 18 | 0.79 | 40 |

*$P_d$ × 50 feet

It should be noted that in the preferred embodiment, the inside diameter of the approximately 25 feet of return tubing (i.e., the tubing returning hydraulic fluid from the hydraulic motor to the clutch pump) has a greater diameter than that of the approximately 25 feet of discharge tubing (i.e., the tubing taking hydraulic fluid from the clutch pump to the hydraulic motor). For example, the preferred embodiment contemplates the discharge tubing having an inside diameter of 0.5 inch (NPT designation) and the return tubing having an inside diameter of 0.75 inch (NPT designation); the equivalent corresponding UNC designations are ⅞–12 and 1¹⁄₁₆–14, respectively, the difference between the NPT and the UNC designations being in the threads at the fittings. The preferred embodiment also contemplates the use of return tubing having an inside diameter of 1 inch. Because the pressure loss through the tubing that does no work is greater if the return tubing has a smaller inside diameter, the data generated in Table 4 (determined by using an inside diameter of 0.5 inch for all 50 feet of tubing) will result in a heat load for the heat exchanger (discussed below) that is slightly larger than that actually required by the hydraulic system. The importance of this fact is that the heat exchanger should have more than enough capacity when the hydraulic system is being run under normal operating conditions.

D. Heat Exchanger Requirements

In general, under normal operations of a hydraulic system, the temperature of hydraulic fluid increases because the system generates some heat that does no work. When the temperature increases, the volume occupied by the hydraulic fluid also increases. Conventional hydraulic systems use a large reservoir or tank to accommodate this increased volume and to passively dissipate the heat. However, as noted above, the hydraulic system of the present invention would require a tank of approximately 60 gallon capacity; such a large tank would obviously not be feasible if the hydraulic system is to mounted within the engine compartment of a standard pickup truck due to the limited space therein. Because the present invention uses a heat exchanger to actively remove nearly all of the heat generated by the hydraulic system, a much smaller tank than 60 gallons may be used with the present invention.

As was previously presented, approximately 10% of the clutch pump's horsepower is wasted (i.e., it performs no work), and there is a pressure loss through the tubing that also does no work. Moreover, the hydraulic motor is not completely efficient; in general, 10% of the motor's power output is wasted and thus merely generates heat. Therefore, the heat generated by the clutch pump and the hydraulic motor together is approximately 20%.

Equation 5 may be used to calculate the BTU/h capacity of the heat exchanger:

$$BTU/h = 1.5 \times GPM \times psi_{loss} \quad \text{Equation 5}$$

The term $psi_{loss}$ is the pressure loss over the system which does no work and generates heat; thus, the term encompasses the heat generated by the clutch pump and the hydraulic motor (approximately 20% total), and the loss through the tubing (Table 4). Since the maximum desired hydraulic pressure of the system is 2500 psi (Table 1), the $psi_{loss} = (20\% \times 2500 \text{ psi}) + (\text{pressure loss through the tubing})$. Table 5 sets forth the requirements for the heat exchanger calculated by using Equation 5.

TABLE 5

| GPM | Pressure Loss Over 50 Feet | $psi_{loss}$ | BTU/h |
| --- | --- | --- | --- |
| 11 | 24 | 524 | 8,646 |
| 18 | 40 | 540 | 14,580 |

Since the hydraulic system is designed to operate within a flow range of 11–20 GPM (Table 1) and based on the BTU/h values contained in Table 5, the heat exchanger should have a heat load of about 15,000–20,000 BTU/h. Besides this heat load requirement, the heat exchanger has other particular requirements which are summarized in Table 6.

TABLE 6

| Parameter | Requirement |
| --- | --- |
| Heat Load | 15,000–20,000 BTU/h |
| Air Flow | 1000 FPM |
| Check Valve (Allow For Cold Starts) | 5–50 psi |
| GPM | 20 maximum |
| Desired Inlet Fluid Temperature | 160° F. |
| Maximum Allowed Hydraulic Fluid Pressure Change | 20 psi |

The total capacity of the heat exchanger required to accommodate a heat load of 15,000–20,000 BTU/h can be calculated by using Equation 6 and particular data set forth in Table 6.

$$\frac{[\text{Heat Load (BTU/h)} \times 100° \text{ F.}]}{[\text{desired inlet fluid}° \text{ F.} - \text{inlet air}° \text{ F.}]} \quad \text{Equation 6}$$

Assuming an inlet air temperature of 80° F., a heat load of 20,000 BTU/h, and an inlet fluid temperature of 160° F., the total capacity of the heat exchanger is 25,000 BTU/h. Though not limited to any specific manufacturer, heat exchangers manufactured by Hayden Heat Exchangers (Corona, Calif.) are suitable for use with the hydraulic system; one merely would need to choose a heat exchanger from the manufacturer's catalog having a minimum capacity of 25,000 BTU/h and the desired flow in GPM.

Figure 4:
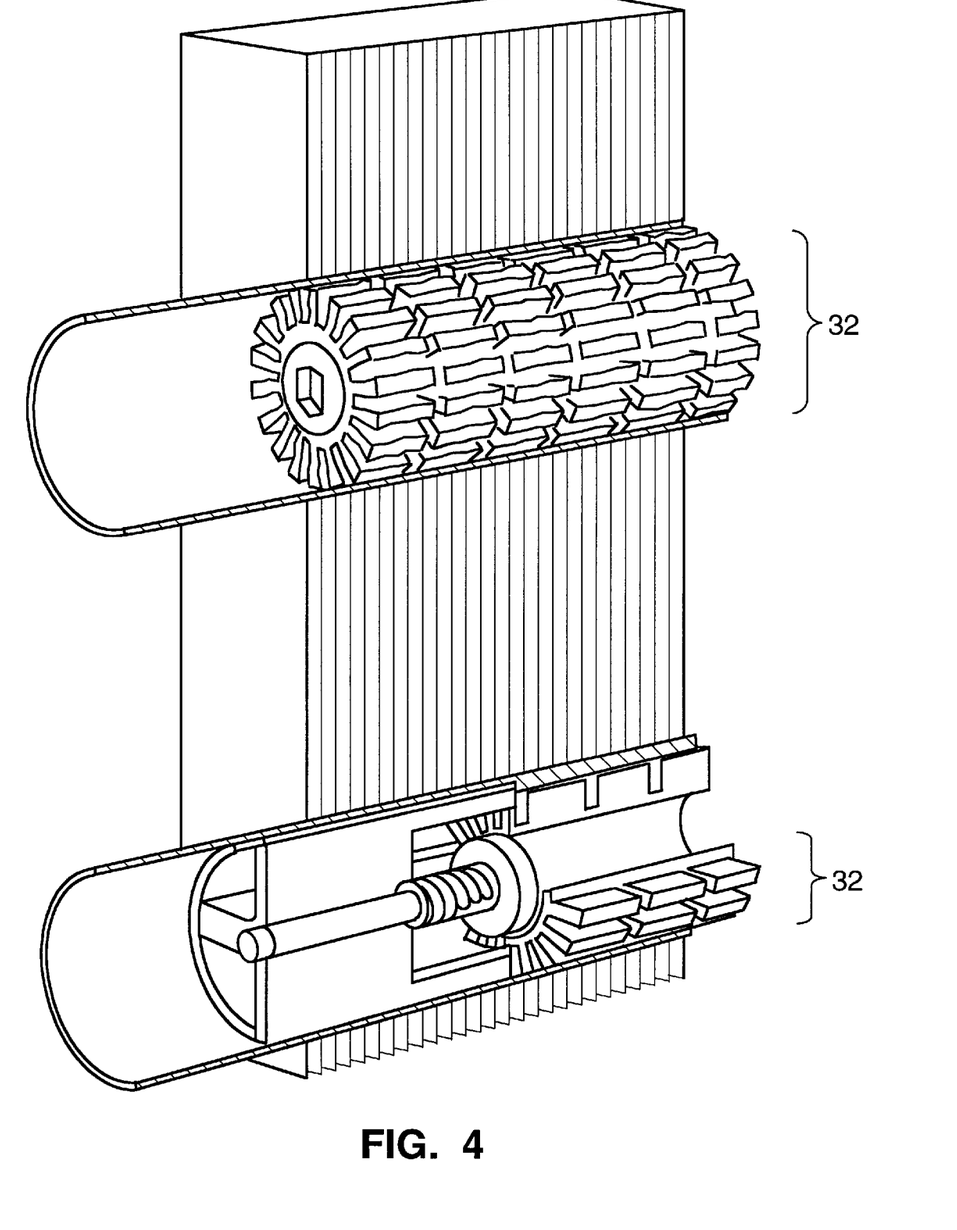
FIG. 4 is a perspective view of one embodiment of a typical heat exchanger contemplated for use with the present invention.

FIG. 4 depicts one embodiment of the heat exchanger contemplated for use with the present invention. The invention contemplates the use of a conventional heat exchanger unit having tubes or fins 32 (shown generally in FIG. 4) for the actual heat exchanging process. As previously noted, a check valve (not shown in FIG. 4) may be built into the heat exchanger and may allow the hydraulic fluid to circumvent the heat exchanger when the pressure of the fluid exceeds a particular value (e.g., 10 psi); such a situation occurs, for example, when the hydraulic fluid is cold (e.g., less than 40° F.) and thus highly viscous. The preferred embodiment contemplates the use of an active heat exchanger; that is, a heat exchanger that has a fan built into it to help with heat dissipation. The use of such a heat exchanger would be beneficial in that it would have no effect on the truck's radiator. Hayden Heat Exchangers (Corona, Calif.) manufactures these active heat exchangers.

E. Tank Requirements

The size of the tank must be large enough to accommodate all of the hydraulic fluid within the hydraulic system. The total volume of fluid can be determined by adding the volume in the tubing, the hydraulic motor, the clutch pump, and the heat exchanger.

As noted above, the preferred embodiment uses approximately 25 feet of discharge tubing of 0.5 inch inside diameter and approximately 25 feet of return tubing of 0.75 inch inside diameter. In the preferred embodiment, the inside diameter of the tubes within the heat exchanger is 1 inch. The volume of fluid contained in the tubing and in the heat exchanger can be calculated as follows:

$$[(\pi \times (\text{tubing diameter in inches})^2)/4] \times [\text{length of tubing in inches}] \quad \text{Equation 7}$$

The volumes of fluid calculated for the tubing and the heat exchanger using Equation 7, as well as the approximate volumes of fluid within the motor and pump, are contained in Table 7. It should be noted that these values represent the highest volumes that would be expected; the actual volumes would likely be less.

TABLE 7

| Source | Volume (in$^3$) |
| --- | --- |
| Discharge Tubing | 59 |
| Return Tubing | 133 |
| Heat Exchanger | 50 |
| Hydraulic Motor | 50 (maximum) |
| Clutch Pump | 50 (maximum) |
| Total | 347 |

Converting the 347 in$^3$ into gallons, the tank would be required to have a capacity of approximately 1.5 gallons (1 gallon=231 in$^3$). Thus, the size of the tank in the present invention is demonstrably less than that in a conventional hydraulic system (60 gallons) due to the rise of a heat exchanger.

Though the heat exchanger is designed to remove nearly all of the heat, it is still prudent to provide the tank with some additional capacity so that the tank is able to accommodate some volume expansion/contraction during temperature extremes. A tank of 2–5 gallon capacity is sufficient to account for volume fluctuations during such temperature extremes. Finally, the tank's ports should be able to accommodate tubing having an inside diameter of 0.75–1 inch in case tubing of a larger diameter is used.

F. The Snowblower

Figure 5:
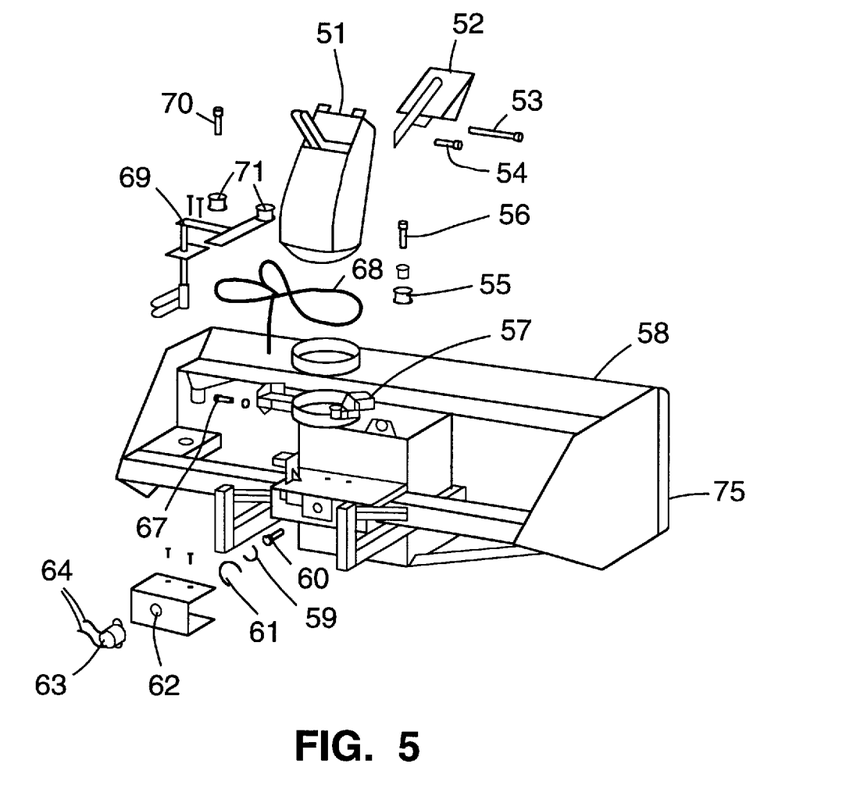
FIG. 5 is a perspective view of many of the components, and their arrangement, of a snowblower contemplated for use with the present invention.

As set forth above, the hydraulic system of the present invention may be used in conjunction with different types of snowblowers. FIG. 5 depicts the components of one typical blower manufactured by Erskine Manufacturing Co., Inc. (Model No. 1812), that has been used with the present invention and is commercially available. Many of the components of the Erskine blower and the configuration of the components are described below. Of course, the present invention is not limited to an Erskine-manufactured snowblower, nor to the configuration of the components described hereafter.

In FIG. 5, the blower chute 51 is hingedly attached to a deflector 52 by means of a pin (3/8"×9") 53. An adjustment pin (3/8"×2½") 54 engages the deflector 52 and attaches to one of several positions on a bracket attached to the blower chute 51, thereby allowing the position of the deflector 52 to be adjusted. The blower chute 51 is attached to the blower body 58 by an attachment means that comprises a roller guide assembly 55 (containing bearings and washers, not shown) bolted to a plastic seal (2¾"×32") 57 by way of a standard 5/8"×1½" bolt 56.

The mechanism for rotating the blower chute 51 entails a chute rotator assembly 69 that is secured to the blower body 58. As indicated in FIG. 5, a pair of shoulder screws (½" by 1") 70 engage a pair of cable pulleys (¼"×2½") 71 (each cable pulley 71 is in contact with two bushings [½×25/32"], not shown). A cable (3/16"×90") 68 is configured such that it contains a pair of small loops, each small loop in movable contact with one of the cable pulleys 71. The cable 68 also contains one large loop that is positioned on the exterior surface of the plastic seal 57 for rotating the blower chute 51. The cable 68 is secured to the plastic seal 57 by a cable clamp means 67. In operation, when the chute rotator assembly 69 is rotated, the position of the cable 68 is moved about the two cable pulleys 71; in response, the large loop of the cable 68 secured to the plastic seal 57 rotates the blower chute 51.

Next, as depicted in FIG. 5, the hydraulic motor 63 is attached to a motor bracket 62 by way of screws. A pair of tubes or hoses (½×double wire) 64 bring hydraulic fluid to the hydraulic motor 63 (one input hose) and take hydraulic fluid away from the hydraulic motor 63 (one output hose). A connector (not shown) connects a chain (#60×12 links) to a first chain coupler (6012×1") 59, which in turn is connected to a second chain coupler (6012×1¼") 60; the second chain coupler 60 is secured to the gearbox to drive the blower fan and the auger (described below and shown in FIG. 6).

FIG. 5 depicts a cutting edge 75 bolted onto one of the vertical edges of the blower body 58. The other vertical edge and the bottom horizontal edge of the blower body 58 have similar cutting edges. It should be noted that in one embodiment, the present invention contemplates a sensor (i.e., an infrared sensor, not shown) mounted on the front-end of the blower body 58. The sensor is adapted to detect a human body or a large object at a predetermined distance (e.g., 6 feet) from the snowblower and shut down the snowblower system in response.

Figure 6:
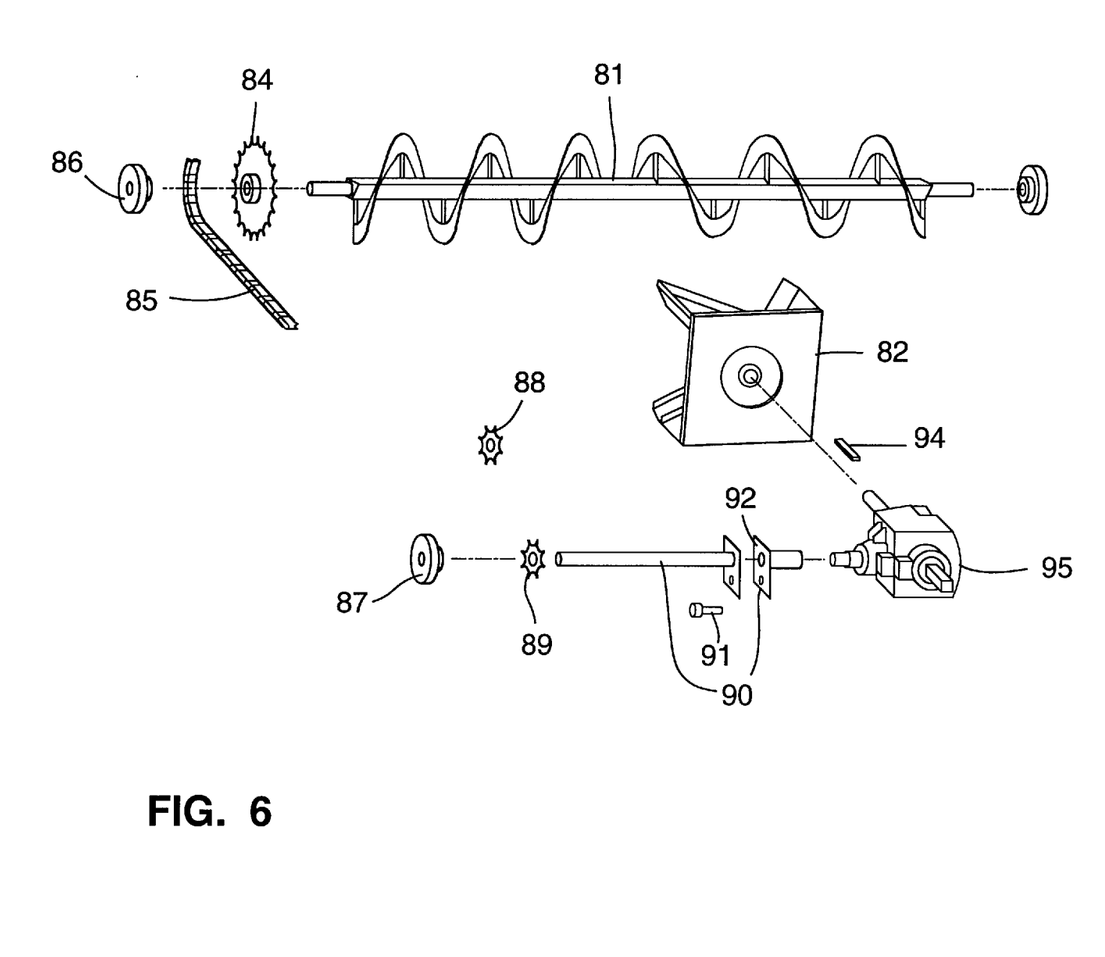
FIG. 6 is a perspective view of those components involved in the process of driving the auger of a snowblower contemplated for use with the present invention.

FIG. 6 depicts the primary components of the auger assembly. As used herein, the auger assembly comprises all of the components used to drive the auger and mount it to the snowblower. The gearbox 95 (e.g., Superior 400 series manufactured by Erskine Manufacturing Co., Inc.) is coupled to the second chain coupler 60 (shown in FIG. 5), thereby transferring drive from the hydraulic motor 63 to the gearbox 95; in turn, the gearbox 95 drives both the fan 82 and the auger 81. First, a square key 94 couples the gearbox 95 to the fan (18"; four blade [not shown]) 82, which blows the snow collected in the blower body 58 through the blower chute 51 and away from the snowblower.

Second, the gearbox 95 is also connected to an auger drive shaft assembly 90, which comprises a splined shear coupler 92 connected with a shear bolt (5/16"×1½"; grade 2) 91. The splined shear coupler 92 connects the gearbox shaft (i.e., the drive shaft) to the auger drive shaft (i.e., the driven shaft) to allow for coupling and shearing in adverse (overload) conditions. In such adverse conditions, the coupling arrangement allows for shearing of only the shear bolt 91; other components of the drive system are not affected. The auger drive shaft assembly 90 communicates drive to the auger 81 (12" diameter) by means of a chain coupling mechanism. This chain coupling mechanism comprises a first sprocket (50×13 tooth) 89 and an idler sprocket (5013×½" bore) 88 secured to the auger drive shaft assembly 90 by flanges and bearing (1¼" bore) 87. The chain coupling mechanism also comprises a second sprocket (50×44 tooth) 84 secured to the auger 81 by a flange and bearing (1¼" bore) 86. Finally, drive is communicated from the first sprocket 89 to the second sprocket 84 through a chain (#50×89 pitches) 85 engaging the first sprocket 89 and the second sprocket 84.

G. Mounting Of The Snowblower To A Vehicle

According to the present invention, the snowblower may be mounted to the front end of a standard road vehicle by any suitable means. In general, the conventional mechanisms for mounting and lifting a snowplow or other attachment may be used in conjunction with the present invention. To illustrate, U.S. Pat. No. 4,421,449 to Cotton, hereby incorporated by reference, describes a vehicle lift attachment that is affixed to a conventional snowplow lift described therein. In addition, U.S. Pat. No. 4,279,084 to Low et al., hereby incorporated by reference, describes a structurally simple and light-weight lift mount for a plow blade. The Low et al. lift mount assembly, which requires a vehicle having longitudinally extending frame members and a laterally extending bumper at the front end of the frame members, can be used in conjunction with most standard pickup trucks. Thus, it should be evident that mounting and lifting means that can be used with a snowblower are common in the art.

Figure 7A:
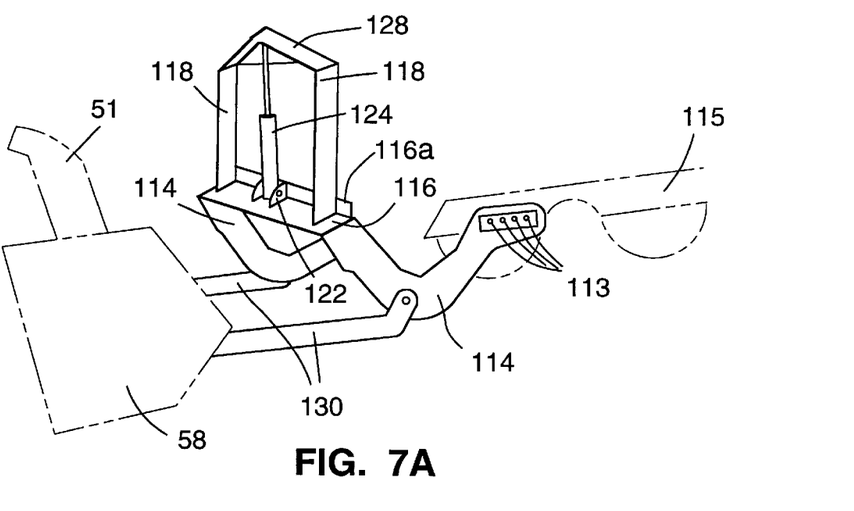
FIG. 7A is a perspective view of many of the components involved in the attachment of a snowblower to a pickup truck.
Figure 7B:
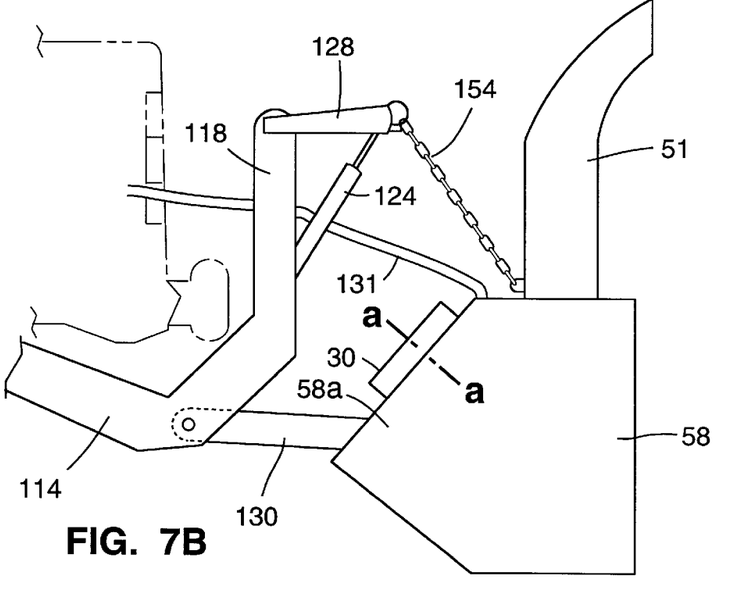
FIG. 7B is a side elevational view of the attachment of a snowblower to a pickup truck.

FIGS. 7A and 7B depict the connection of a snowblower to a pickup truck in one embodiment of the present invention; this embodiment is very similar to that of Cotton et al., supra. In FIG. 7A and 7B, the snowblower is connected to a mounting and lifting means manufactured by Fisher Engineering (Rockland, Me.); in turn, the mounting and lifting means is attached to the undercarriage of a road vehicle, thereby providing the strength necessary to support the snowblower. As indicated above, mounting and lifting means sold by other manufacturers may also be used with the present invention.

Since the mounting and lifting means is known in the art, it will not be described in detail; however, a brief description of its primary components will assist in an understanding of the present invention. Referring to FIGS. 7A and 7B, two laterally spaced, "V"-shaped pushplates 114 are bolted 113 to the vehicle's frame 115 (the front wheel wells provide access for securing the pushplates 114 to the frame 115). The free ends of the pushplates 114 are connected by a frame member 116. What is generally referred to as the headgear projects up from the frame member 116. The headgear consists, in part, of two upright beams 118, each attached to the frame member 116 inboard of its opposing ends. The frame member 116 also includes an upstanding flange 116a that extends along the rear edge of frame member 116; the upstanding flange 116a is also attached to the rear edges of the upright beams 118.

A pair of receptacles 122 are positioned on the top surface of frame member 116 and project forwardly from the upstanding flange 116a. The lower end of a piston 124 is positioned between those receptacles 122 and pivotally connected thereto by a pivot pin (not shown). The other end of the piston 124 is pivotally connected to a lifting frame member 128. As depicted in FIG. 7A, two corners of the triangularly shaped frame member 128 are pivotally connected to the upper ends of the upright beams 118; the piston 124 attaches to the third corner of the lifting frame member 128. The piston is powered by hydraulic fluid diverted by the control valve 15 (FIG. 1) of the hydraulic system previously described. Finally, it should be noted that the hydraulic lines that connect the hydraulic system to the snowblower may protrude from the engine compartment through the vehicle's grille (See FIG. 7B, where one hydraulic line 131 is depicted).

The snowblower (or other implement) is attached to the mounting/lifting means in a manner that allows it to be raised and lowered. First, as shown in FIG. 7A, two connecting beams 130 connect the snowblower to the mounting/lifting means. One end of each connecting beam 130 rigidly attaches to the snowblower, while the other end of each connecting beam 130 is pivotally connected to one of the mounting/lifting means' pushplates 114 (near the base of the pushplate's "V"). In this manner, the connecting beams 130 are able to rotate relative to the pushplates 114, thereby allowing the rigidly connected snowblower to be rotated upwards. Second, one end of a chain 154 is attached (by a hook or other suitable means) to the lifting frame member 128 and the other end to the snowblower (FIG. 7B). Therefore, when the piston 124 is extended, the lifting frame member 128 rotates upward (FIG. 7A). This rotation has the effect of raising the snowblower.

H. Mounting Of The Hydraulic System

In previous sections, the components of the hydraulic system contemplated by the present invention have been described. This section discusses the mechanism by which those components may be attached to the vehicle or to the snowblower unit itself.

Clutch Pump

In a preferred embodiment, the clutch pump 10 was attached to the engine mount. Referring to FIG. 3, when a standard pickup truck was used (i.e., a 1988 Dodge Ram pickup truck), the clutch pump 10 was attached to a bracket/plate 109 (Ralph C. Herman Co. catalog no. DMP 33 (0–4)), which in turn was attached to the engine mount (not shown). Specifically, the bracket/plate 109 was secured to the engine mount at approximately the 2:00 o'clock position (standing directly in front of the truck and locating aft). Thereafter, four bolts (not shown) were used to secure the clutch pump 10 to the bracket/plate 109.

As previously alluded to, the clutch pump 10 requires a dual-belted pulley 11 to accommodate the high torque imparted onto the clutch pump 10. Thus, a dual pulley 101 (Ralph C. Herman Co. catalog no. DPC 322) was installed on the engine to accept the two clutch pump belts (not shown). The engine dual pulley 101 was added to the engine's existing pulleys 107 by using a conical spacer 102 (Ralph C. Herman Co. catalog no. DPA 322). The conical spacer 102 was secured to the existing pulleys 107 by using the same six threaded bolt holes (not shown) on the engine block that were used to secure the existing pulleys 107; however, six longer bolts (not shown) were required, and they replaced the shorter bolts (not shown) used to secure the existing pulleys 107 to the engine block. Two identical belts (½" wide and 63" long; not shown) engaged the clutch pump dual pulley 11 and the engine dual pulley 101 and were secured thereto by 100 pounds of tension; in this manner, power from the vehicle's engine was transferred to the clutch pump 10 and the entire hydraulic system thereafter.

In addition, it should be noted that a washer-type spacer 105 was added to the radiator fan. The spacer 105 insured that the radiator's fan blades would not interfere with the belts traversing the clutch pump 10 and the engine by moving the fan blades further away from the engine itself.

The inlet (return) port 13 and the outlet (discharge) port 12 (FIG. 2B) of the clutch pump 10 were modified by the addition of fittings. This modification allowed for proper mating with the selected diameters of hydraulic lines (e.g., ½ inch discharge line and 1 inch return line).

The clutch pump 10 was also wired (not shown) to receive 12 volt current from the vehicle's existing battery. The wiring was such that the clutch pump 10, and thus the entire hydraulic system, shuts down when the speed exceeds 3500 RPM; this shutting down eliminates the possibility of an overspend condition at the clutch pump 10 and the hydraulic motor 20. Moreover, as described above, the system could also be shut down by an infrared detector, mounted on the front of the blower, that detects objects (heat sources) within a prescribed distance (e.g., 6 feet) from the blower unit.

Heat Exchanger

As indicated above, the heat exchanger may be mounted within the engine compartment itself (in front of the radiator) or on the blower unit itself (on the back of the shovel 58a).

When the heat exchanger 30 is mounted in front of the radiator (either with or without its own active fan(s)), mounting brackets connected to the radiator mounting frame are used to position the heat exchanger 30. More specifically, the heat exchanger 30 is positioned at least one inch away from the radiator and is centered in relationship to the radiator. The bypass check valve 35 is connected to the return line and is in parallel with the heat exchanger to allow the hydraulic fluid to bypass the heat exchanger in cold conditions. However, as indicated previously, the bypass check valve may be an integral part of the heat exchanger, or it may be in parallel with the heat exchanger.

Figure 7C:
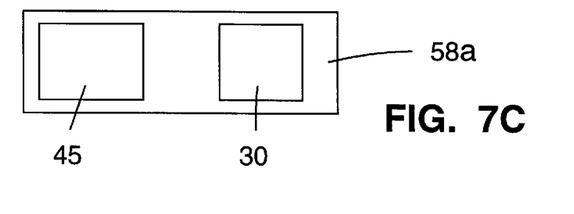
FIG. 7C, a view taken along line a—a in FIG. 7B, depicts an embodiment in which both the heat exchanger and the hydraulic tank are attached to the back of the shovel.

Conversely, the heat exchanger 30 may be attached directly to the back of the shovel 58a of the blower unit. In this arrangement, the heat exchanger 30 may be, for example, bolted directly onto the metal of the blower unit, which allows for heat conduction through the metal, followed by convection from the metal to the surrounding snow (see FIGS. 7B and 7C). Alternatively, a fan in electrical connection with the vehicle's battery could be used to actively cool the heat exchanger 30. FIG. 7C, a view taken along line a—a in FIG. 7B, depicts one arrangement where both the heat exchanger 30 and the hydraulic tank 45 are attached to the back of the shovel 58a; of course these components could be placed in a different spatial location on the back of the shovel 58a. Similarly, one or more of these components might be placed elsewhere on the blower unit.

Hydraulic Tank

The hydraulic tank 45 can be placed inside the engine compartment in a side area where a wheel well is located. No specific attachment means is required, and any mounting arrangement will suffice provided that the hydraulic tank 45 is adequately secured.

Analogous to the situation with the heat exchanger 30, the hydraulic tank 45 may also be bolted to the back of the shovel 58a of the blower unit (see FIG. 7C). Placement of the hydraulic tank 45 and/or the heat exchanger 30 in this locale will allow the hydraulic system to be used in vehicles with limited space in the engine compartment.

Filter And Valves

The filter 40 can be positioned at the outlet of the hydraulic tank 45 (FIG. 1) or at the inlet of the hydraulic tank 45. No special hardware is required; instead, the filter 40 is held in position by the fittings used in its installation.

As described previously, the control valve 15 is a diverter valve which receives high pressure hydraulic fluid and diverts it to a spool valve, e.g., a four-way spool valve (not shown); in turn, when activated either electrically or by a mechanical lever, the spool valve releases hydraulic fluid at a pressure sufficient to raise or rotate (i.e., turn left or right) the blower. The control valve 15 does not necessarily need to be placed in the engine compartment. The blower unit provides a suitable location for mounting.

From the above, it should be evident that the present invention provides for a unique hydraulic system capable of being driven by the engine of a vehicle such as a standard pickup truck or the like to power a front-mounted snowblower or other implement. The hydraulic system is designed so that it can be contained entirely within the engine compartment of the vehicle and so that it requires minimal modification of the vehicle's mechanical components. Modifications of the invention described above will be apparent to those skilled in the art of hydraulic systems and snowblowers, and it is to be understood that such modifications are within the spirit and scope of the disclosure and the claims that follow.

We claim:

1. A hydraulic system adapted to take power from the engine of a road vehicle for driving an implement, comprising:
   (a) hydraulic fluid, said hydraulic fluid contained within fluid transport means and capable of being heated by the operation of said hydraulic system;
   (b) a pump, said pump adapted to receive power generated by said engine and to use that power to pressurize said hydraulic fluid;
   (c) a motor, said motor adapted to receive said pressurized hydraulic fluid from said pump via said fluid transport means, to drive said implement; and
   (d) a heat exchanger with a capacity of greater than 15,000 BTU/h, said heat exchanger coupled to said fluid transport means and adapted to remove the heat from said pressurized hydraulic fluid after said hydraulic fluid has been discharged from said motor;
   (e) a tank, said tank providing a reservoir for said hydraulic fluid, said tank having a capacity of less than 5 gallons.

2. The hydraulic system as recited in claim 1, wherein said pump is adapted to be contained within the engine compartment of said road vehicle.

3. The hydraulic system as recited in claim 1, wherein said tank is adapted to be mounted on said implement of said road vehicle.

4. The hydraulic system as recited in claim 1, wherein said tank has a capacity of less than 2.5 gallons.

5. The hydraulic system as recited in claim 1, wherein said pump is a variable displacement pump.

6. The hydraulic system as recited in claim 1, wherein said pump is a fixed displacement pump.

7. The hydraulic system as recited in claim 1, wherein said implement is a snowblower.

8. The hydraulic system as recited in claim 1, wherein said heat exchanger has a check valve to allow said hydraulic system to be started in cold conditions.

9. A hydraulic system comprising components, some of said components adapted to be contained within the engine compartment of a road vehicle wherein the road vehicle has an engine capable of generating power for driving an implement, comprising:
   (a) hydraulic fluid, said hydraulic fluid contained within fluid transport means and capable of being heated by the operation of said hydraulic system;
   (b) a pump, said pump adapted to receive power generated by said engine and to use that power to pressurize said hydraulic fluid;
   (c) a motor, said motor adapted to receive said pressurized hydraulic fluid from said pump via said fluid transport means, to drive said implement;
   (d) a heat exchanger with a capacity of greater than 15,000 BTU/h, said heat exchanger coupled to said fluid transport means and adapted to remove the heat from said pressurized hydraulic fluid after said hydraulic fluid has been discharged from said motor; and
   (e) a tank, having a capacity of less than 5 gallons, in fluidic communication with said fluid transport means and providing a reservoir for said hydraulic fluid after removal of heat from said hydraulic fluid by said heat exchanger.

10. The hydraulic system as recited in claim 9, wherein said pump is a variable displacement pump.

11. The hydraulic system as recited in claim 10, wherein said pump is a fixed displacement pump.

12. The hydraulic system as recited in claim 9, wherein said implement is a snowblower.

13. The hydraulic system as recited in claim 9, wherein said heat exchanger has a check valve to allow said hydraulic system to be started in cold conditions.

14. The hydraulic system as recited in claim 9, wherein said tank has a capacity of less than 2.5 gallons.

* * * * *